(12) United States Patent
Sato et al.

(10) Patent No.: US 6,380,117 B2
(45) Date of Patent: *Apr. 30, 2002

(54) DIELECTRIC MATERIAL AND PROCESS FOR PRODUCING THE SAME

(75) Inventors: Motohiko Sato, Inazawa; Hitoshi Yokoi; Kazushige Ohbayashi, both of Nagoya, all of (JP)

(73) Assignee: NGK Spark Plug Co., Ltd., Aichi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/333,944

(22) Filed: Jun. 16, 1999

(30) Foreign Application Priority Data

Jun. 16, 1998 (JP) .............................. 10-186857

(51) Int. Cl.⁷ ............................................ C04B 35/468
(52) U.S. Cl. ........................................................ 501/139
(58) Field of Search ......................................... 501/139

(56) References Cited

U.S. PATENT DOCUMENTS 4,330,631 A  5/1982  Kawashima et al. ........ 501/139
4,643,984 A * 2/1987 Abe et al. .................... 501/134

FOREIGN PATENT DOCUMENTS

| EP | 10029863 | 2/1998 | |
| EP | 0 873 979 A1 | 10/1998 | |
| JP | 59-37526 | 9/1984 | ............ H01B/3/12 |
| JP | 59-37527 | 9/1984 | ............ H01B/3/12 |
| JP | 59-48484 | 11/1984 | ............ H01B/3/12 |
| JP | 60-54899 | 12/1985 | ............ C04B/35/00 |
| JP | 002115343 | 3/1988 | |
| JP | 63-222064 | 9/1988 | ............ C04B/35/00 |
| JP | 6-44406 | 6/1994 | ............ H01B/3/12 |
| JP | 002115344 | 11/1994 | |
| JP | 6-309926 | 11/1994 | ............ H01B/3/12 |
| JP | 6-325620 | 11/1994 | ............ H01B/3/12 |
| JP | 8-15012 | 2/1996 | ............ H01B/3/12 |

* cited by examiner

*Primary Examiner*—David Brunsman
(74) *Attorney, Agent, or Firm*—Sughrue Mion, PLLC

(57) ABSTRACT

Disclosed is a dielectric material comprising: 100 parts by weight of a main component having a composition represented by formula: $xBaO$—$yRE_2O_3$—$zTiO_2$, wherein RE represents at least one rare earth element and $x+y+z=100$ mol %; 5 parts by weight or less of at least one alkali metal oxide; and 5 parts by weight or less of $Bi_2O_3$.

17 Claims, 4 Drawing Sheets

DIELECTRIC MATERIAL AND PROCESS FOR PRODUCING THE SAME

FIELD OF THE INVENTION

This invention relates to a dielectric material and a process for producing the same. More particularly, it relates to a dielectric material having excellent dielectric characteristics, such as a relatively high specific dielectric constant (hereinafter represented by $\epsilon_r$) in a high frequency region, a small absolute value of a temperature coefficient (hereinafter represented by $\tau_f$) of resonance frequency (hereinafter represented by $f_0$), and a large unloaded quality value (hereinafter represented by $Q_u$), and a process for producing the same. The dielectric material of the invention is particularly useful as a resonator and a filter for a high frequency region, a matching element for various microwave circuits, and the like.

BACKGROUND OF THE INVENTION

With the recent increase of communication information, various communication systems using the microwave region, such as mobile telecommunication systems, satellite communication systems, positioning systems using communication data, and satellite broadcasting, have been advancing rapidly. Many dielectric materials for microwave have been developed accordingly. The dielectric materials for microwave are required to have (1) a high specific dielectric constant $\epsilon_r$, (2) a small absolute value of a temperature coefficient $\tau_f$ of resonance frequency $f_0$ (i.e., small temperature dependence of $f_0$), and (3) a large unloaded Q-value $Q_u$ (i.e., small dielectric loss $1/Q_u$).

Known dielectric materials with a small dielectric loss, i.e., with a large $Q_u$, include Ba (Mg$_{1/3}$Ta$_{2/3}$) O$_3$ and Ba (Zn$_{1/3}$Ta$_{2/3}$) O$_3$, and known dielectric materials with a high $\epsilon_r$ include BaO—RE$_2$O$_3$—TiO$_2$-based ceramics (wherein RE represents a rare earth element)

JP-A-6-275126 discloses a dielectric ceramic composition comprising Ba, Bi, Ti and O as essential components and Nd and Sm as optional components. JP-A-6-309926 and JP-A-6-325620 teach addition of an alkali metal, e.g., Na, Kor Li, to the above-described ceramic composition to further improve the dielectric characteristics, explaining that $Q_u$ can be improved without changing $\epsilon_r$. On the other hand, it is mentioned that an increase in Bi content increases $\epsilon_r$ and decreases the absolute value of $\tau_f$ but diminishes $Q_u$. In fact, the ceramic compositions disclosed in the above publications have a considerable Bi content and cannot be necessarily said to have a high $Q_u$. Besides, the $\tau_f$ varies widely among the compositions.

SUMMARY OF THE INVENTION

An object of the present invention is to provide a dielectric material having a high $\epsilon_r$, a small absolute value of $\tau_f$, or with the $\tau_f$ adjusted to the negative side, and a large $Q_u$ and a process for producing the same.

Another object of the invention is to provide a dielectric material that meets the demands for communication equipment having reduced size and height and is also applicable to new uses in, for example, a duplexer while exhibiting improved dielectric characteristics and a process for producing the same. A $Q_u$ is a relatively important characteristic for use in a duplexer, etc., and it is required that $Q_u \times f_0$ be 5000 GHz or more, particularly 6000 GHz or more. The present invention provides a dielectric material satisfying this requirement.

DETAILED DESCRIPTION OF THE INVENTION

Figure 1:
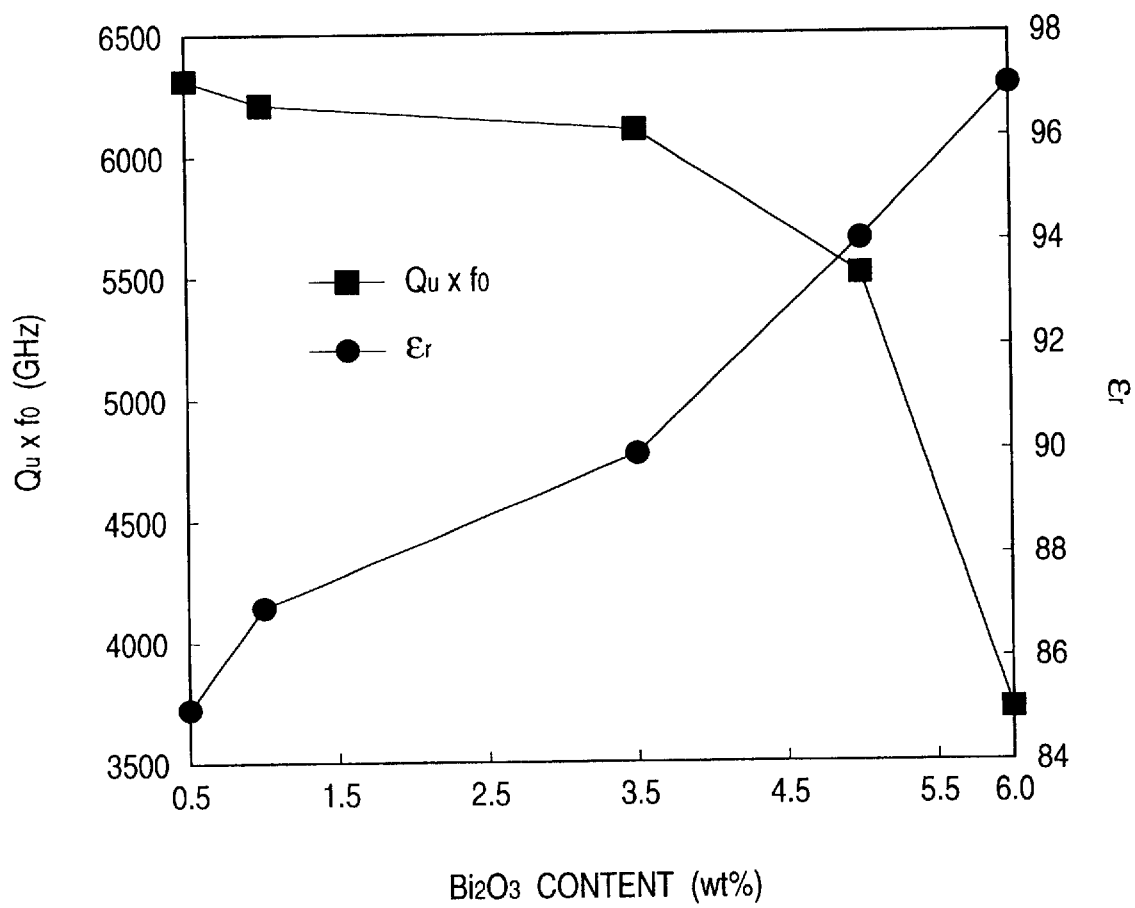
FIG. 1 is a graph of $Q_u \times f_0$ and $\epsilon_r$ vs. Bi$_2$O$_3$ content in the dielectric materials prepared in Run Nos. 9 to 12.

The present invention provides in its first aspect a dielectric material comprising 100 parts by weight of a main component having a composition represented by formula: xBaO—yRE$_2$O$_3$—zTiO$_2$ (wherein RE represents at least one rare earth element; and x+y+z=100 mol %), 5 parts by weight or less of at least one alkali metal oxide, and 5 parts by weight or less of Bi$_2$O$_3$, the product of unloaded Q-value and resonance frequency of the dielectric material being preferably 6000 GHz or more.

The present invention also provides in its second aspect a dielectric material comprising 100 parts by weight of a main component having a composition represented by formula: xBaO—yRE$_2$O$_3$—zTiO$_2$ (wherein RE represents at least one rare earth element; and x+y+z=100 mol %), 5 parts by weight or less of at least one alkali metal oxide, and 3.5 parts by weight or less of Bi$_2$O$_3$.

In formula xBaO—yRE$_2$O$_3$—zTiO$_2$, the molar ratio of BaO, represented by x, is preferably greater than 0 and not greater than 27.0, still preferably from 5.0 to 22.5. BaO, particularly being present in an amount of 5.0 mol % or higher, especially 10.0 mol % or more, based on the main component brings about sufficient improvement in $\epsilon_r$. If the molar quantity of BaO exceeds 27.0 mol %, $Q_u$ tends to decrease.

The molar ratio of RE$_2$O$_3$, represented by y, is preferably greater then 0 and not greater than 30.0 mol %, still preferably 21.0 mol % or less. RE$_2$O$_3$ particularly being present in an amount of 4.0 mol % or more, especially 11.0 mol % or more, sufficiently diminishes the absolute value of $\tau_f$. Existence of more than 30.0 mol % of RE$_2$O$_3$ is apt to reduce $Q_u$.

RE$_2$O$_3$ includes La$_2$O$_3$, CeO$_2$, Pr$_6$O$_{11}$, Nd$_2$O$_3$, Sm$_2$O$_3$, and a mixture of two or more thereof. RE$_2$O$_3$ also includes an oxide or complex oxide containing at least samarium which is represented by formula: [(Sm$_2$O$_3$)$_{1-a-b}$(Nd$_2$O$_3$)$_a$ (La$_2$O$_3$)$_b$], wherein $0 \leq a < 1$, $0 \leq b < 1$, and $a+b<1$, i.e., samarium oxide part of Sm of which may be displaced with Nd and/or La.

RE$_2$O$_3$ can be incorporated into the main component by adding, to a powdered raw material, the rare earth element oxide or a precursor thereof producing the corresponding oxide on heating, such as an oxalate, a nitrate, a sulfate or a chloride.

The molar ratio of TiO$_2$, represented by z, is preferably 55.0 or greater and smaller than 100.0, still preferably 62.5 or greater and less than 95.0. TiO$_2$, being present in an amount of 55.0 mol % or more, especially 62.5 mol % or more, improves $Q_u$, sufficiently. With the molar quantity of TiO$_2$ being less than 95.0 mol %, particularly less than 80.0 mol %, the absolute value of $\tau_f$ can be reduced further.

The alkali metal oxide which can be used in the present invention includes lithium oxide, sodium oxide, potassium oxide, and a mixture of two or more thereof. These alkali metal oxides are easy to handle and economical. The existence of the alkali metal oxide is effective in lowering the sintering temperature, making it possible to produce a sufficiently dense sinter at a reduced sintering temperature.

If the alkali metal oxide is present in an amount exceeding 5 parts by weight per 100 parts by weight of the main component, the sintering is instable, and the resulting dielectric material has a reduced $Q_u$. Further, $\tau_f$ shifts to the negative side and its absolute value increases. A preferred alkali metal oxide content is from 0.1 to 5 parts by weight. Even with the alkali metal oxide content being as small as 0.1 to 2.0 parts, particularly 0.2 to 1.0 part, a dielectric material having excellent dielectric characteristics can be obtained in a stable manner.

The alkali metal oxide can be incorporated into the dielectric material by adding to a powdered raw material the alkali metal oxide or a precursor thereof producing the corresponding oxide on heating, such as a carbonate, an oxalate, a nitrate or a sulfate.

The $Bi_2O_3$ content in the dielectric material according to the first aspect of the invention is 5 parts by weight or less, preferably 0.1 to 5 parts by weight, still preferably 0.1 to 3 parts by weight, per 100 parts by weight of the main component. If it is less then 0.1 part, no improvement on $\epsilon_r$ results. If it exceeds 5 parts, $Q_u \times f_0$ greatly decreases below 6000 GHz. The $Bi_2O_3$ content in the dielectric material according to the second aspect of the invention is 3.5 parts by weight or less. Even where the $Bi_2O_3$ content is relatively small as in the second aspect, a combination with the specific main component and the alkali metal oxide assures excellent $\epsilon_r$ and $Q_u$.

$Bi_2O_3$ can be incorporated into the dielectric material by adding to a powdered raw material $Bi_2O_3$ or a precursor thereof producing $Bi_2O_3$ on heating, such as bismuth oxalate, bismuth nitrate, bismuth sulfate or bismuth chloride.

The dielectric material of the present invention may be produced by mixing the raw materials, (optionally calcining the mixture), compacting the mixture, and sintering the compact. The calcination may be conducted at a temperature of 1,000 to 1,200° C. for 1 to 3 hours (e.g., 1000° C., 2 hours). The sintering may be conducted at a temperature of 1,250° C. to 1,400° C. for 1 to 5 hours (e.g., 1,350° C., 2 hours).

The dielectric material according to the present invention is preferably produced by a process comprising using a raw material containing a hydroxyl group as a starting material for the rare earth element component, $RE_2O_3$, or a process having a step of introducing a hydroxyl group to the surface of the raw material for $RE_2O_3$.

The term "raw material containing a hydroxyl group" as used herein means a raw material that shows an absorption peak assigned to a hydroxyl group in Fourier transform infrared spectrophotometry (hereinafter abbreviated as FT-IR). Such hydroxyl-containing raw materials include rare earth element hydroxides and rare earth element oxides having a moisture absorption layer on the surface thereof. $RE(OH)_3$ is particularly preferred.

When a hydroxyl-containing raw material is used, there is obtained a sinter dense enough to measure dielectric characteristics even where primary mixing and grinding are carried out by using a nonaqueous solvent, such as ethanol. Although the reason therefor is not necessarily clear, it is considered that the hydroxyl group releases from the raw material during calcination or sintering to make the material highly active, thereby accelerating sintering and densification.

The above-described effect produced by using a hydroxyl-containing raw material can also be obtained by introducing a hydroxyl group to a rare earth element compound containing no hydroxyl group. A hydroxyl group can be introduced into a rare earth element compound by mixing raw material powders using water as a dispersing medium.

Where samarium is used in combination with other rare earth elements, the raw materials for the other rare earth elements do not always need to contain a hydroxyl group in order to obtain a sufficiently densified dielectric material only if the raw material for the samarium component contains a hydroxyl group. it is preferred to use Sm as a rare earth element. It is therefore preferred to use at least samarium as a rare earth element.

Where a nonaqueous solvent, such as ethanol, is used as a dispersing medium in the steps of primary mixing and grinding, the resulting sinter has insufficient denseness for measuring the dielectric characteristics unless a hydroxyl-containing raw material is used as a starting material for the rare earth element component or unless the step of introducing a hydroxyl group to the raw material is taken.

The present invention will now be illustrated in greater detail with reference to Examples. Unless otherwise noted, all the parts are given by weight.

EXAMPLE 1

Investigation into Composition of Dielectric Material

Commercially available $BaCO_3$, $Sm(OH)_3$, $TiO_2$, $A_2CO_3$ (wherein A represents an alkali metal), and $Bi_2O_3$, all in a powdered form, were weighed out to give the composition shown in Tables 1 and 2 below in terms of the respective oxides.

The raw material powders were wet mixed using ethanol as a medium, and the mixed powder was calcined in the atmosphere at 1000° C. for 2 hours. The calcined product was ground in a ball mill together with a wax binder, a dispersant, and ethanol. The slip was dried, granulated, and preliminarily molded under a pressure of 10 to 20 MPa into a column of 20 mm in diameter and 12 mm in thickness. The column was subjected to cold isostatic pressing (CIP), and the resulting molded article was sintered at 1350° C. for 2 hours in the atmosphere to obtain a sinter.

The surface of the resulting sinter (dielectric material) was polished, and $\epsilon_r$, $Q_u$, and $\tau_f$ (at temperatures varying from 25° to 80° C.) were measured at a frequency of 2 to 4 GHz by the Hakki and Coleman's method in a frequency range of 2 to 4 GHz. The results obtained are shown in Tables 1 and 2, in which the asterisk mark * indicates "out of the range of the first aspect of the invention", and the double asterisk mark ** indicates "out of the range of the second aspect of the invention". FIG. 1 is the plots of $\epsilon_r$ and $Q_u \times f_0$ against $Bi_2O_3$ content as measured in Run Nos. 9 to 12.

TABLE 1

| | Main Component | | | Alkali Metal Oxide | | Bi$_2$O$_3$ | Dielectric Characteristics | | |
|---|---|---|---|---|---|---|---|---|---|
| Run No. | BaO x | Sm$_2$O$_3$ y | TiO$_2$ z | Kind of Metal | Amount (part) | Content (part) | $\epsilon_r$ | $Q_u \times f_0$ (GHz) | $\tau_f$ (ppm/°C.) |
| 1 | 25.0 | 10.0 | 65.0 | Na | 0.10 | 1.0 | 87 | 6200 | 2 |
| 2 | 25.0 | 10.0 | 65.0 | | 0.10 | 2.0 | 89 | 6000 | 0 |
| 3 | 20.0 | 20.0 | 60.0 | | 0.50 | 2.0 | 85 | 6500 | 6 |
| 4 | 12.5 | 25.0 | 62.5 | | 2.00 | **4.0 | 86 | *5500 | −10 |
| 5 | 12.5 | 25.0 | 62.5 | K | 2.00 | **4.5 | 90 | *5200 | −14 |
| 6 | 15.0 | 20.0 | 65.0 | Na | 0.30 | 1.5 | 88 | 6300 | 5 |
| 7 | 15.0 | 20.0 | 65.0 | | 0.30 | 3.0 | 95 | 6000 | 1 |
| 8 | 20.0 | 10.0 | 70.0 | Li | 3.00 | 2.5 | 75 | 8000 | 4 |
| 9 | 15.0 | 17.5 | 67.5 | Na | 0.20 | 0.5 | 85 | 6300 | −5 |
| 10 | 15.0 | 17.5 | 67.5 | | 0.20 | 1.0 | 87 | 6200 | −9 |
| 11 | 15.0 | 17.5 | 67.5 | | 0.20 | 3.5 | 90 | 6100 | −11 |
| 12 | 15.0 | 17.5 | 67.5 | | 0.20 | **5.0 | 94 | *5500 | −8 |

TABLE 2

| | Main Component | | | Alkali Metal Oxide | | Bi$_2$O$_3$ | Dielectric Characteristics | | |
|---|---|---|---|---|---|---|---|---|---|
| Run No. | BaO x | Sm$_2$O$_3$ y | TiO$_2$ z | Kind of Metal | Amount (part) | Content (part) | $\epsilon_r$ | $Q_u \times f_0$ (GHz) | $\tau_f$ (ppm/°C.) |
| 13 | 7.0 | 15.0 | 77.5 | Na | 0.50 | 3.0 | 93 | 6500 | −20 |
| 14 | 12.5 | 15.0 | 72.5 | K | 1.00 | *0.0 | 84 | 7400 | 10 |
| 15 | | | | | | 3.0 | 93 | 7200 | 18 |
| 16 | 15.0 | 15.0 | 70.0 | Na | 0.50 | *0.0 | 76 | 7700 | −11 |
| 17 | | | | | | 1.0 | 80 | 7100 | −10 |
| 18 | | | | | | 2.0 | 83 | 6800 | −12 |
| 19 | | | | | | 3.5 | 87 | 6500 | −18 |
| 20 | 15.0 | 5.0 | 80.0 | | 0.75 | **5.0 | 65 | 7800 | −16 |
| 21 | 7.5 | 7.5 | 85.0 | | 2.50 | **4.0 | 96 | *5300 | 10 |
| 22 | 12.5 | 17.5 | 75.0 | | 0.50 | *10.0 | 105 | *1700 | 25 |
| 23 | 15.0 | 17.5 | 67.5 | | 0.25 | *6.0 | 97 | *3700 | 20 |
| 24 | 10.0 | 7.5 | 82.5 | | 2.00 | *15.0 | weak resonance | | |

As is apparent from the results in Tables 1 and 2, the dielectric materials of Run Nos. 1 to 3, 6 to 11, 13, 15, and 17 to 19 have an absolute $\tau_f$ value of not greater than 20 ppm/°C. with small scatter and $Q_u \times f_0$ of 6000 GHz or greater, proving to have a small dielectric loss. The dielectric material of Run No. 20, which has a Bi$_2$O$_3$ content out of the range of the second aspect of the invention but in the range of the first aspect of the invention, also proves excellent in dielectric characteristics.

While it is known that incorporation of Bi$_2$O$_3$ generally results in a considerable reduction of $Q_u$, a comparison with Run Nos. 14 and 16 where Bi$_2$O$_3$ is not used reveals that the reduction of $Q_u$ is suppressed in the present invention. In Run Nos. 22 to 24 where more than 5 parts of Bi$_2$O$_3$ is used, the $Q_u \times f_0$ reached is about 3700 GHz at the most, or the resonance is too weak to measure $Q_u \times f_0$. The $Q_u \times f_0$ in Run Nos. 4, 5, 12, and 21 where the Bi$_2$O$_3$ content exceeds 3.5 parts is below 6000 GHz. These observations are graphed in FIG. 1, in which $Q_u \times f_0$ begins to reduce as the Bi$_2$O$_3$ content exceeds 3.5 parts and appreciably reduces as the Bi$_2$O$_3$ content exceeds 5 parts.

While conventional ceramics of this type of composition have largely scattering $\tau_f$ and $Q_u$, the dielectric materials according to the present invention have an absolute $\tau_f$ value controlled to a range as narrow as 20 ppm/°C. or smaller and $Q_u \times f_0$ of 6000 GHz or higher, which can be seen as relatively high.

EXAMPLE 2

Investigation on Raw Material for Rare Earth Element Component

Figure 2:
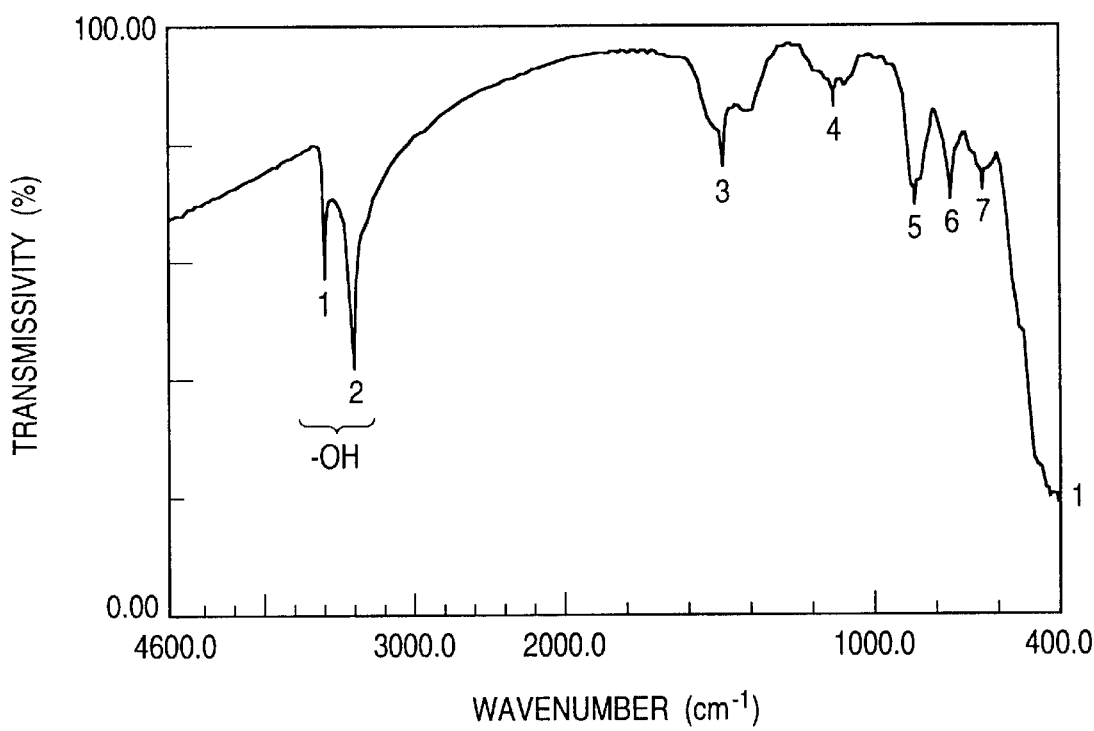
FIG. 2 is the FT-IR chart of hydroxyl-containing Sm$_2$O$_3$.
Figure 3:
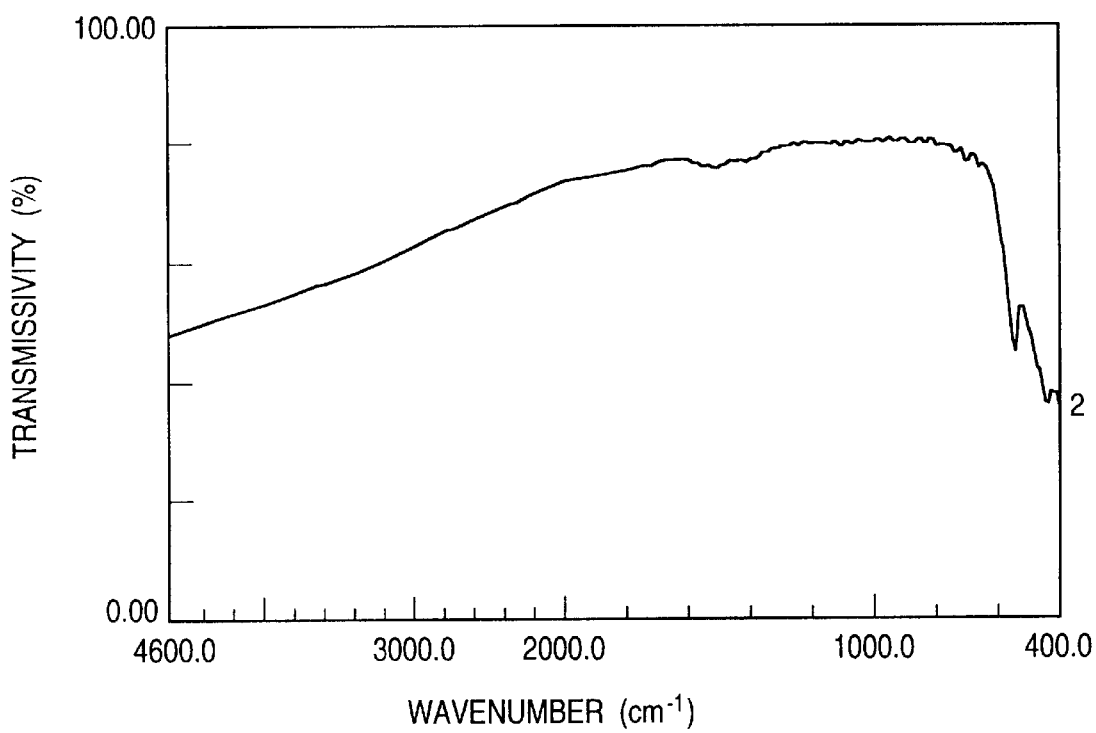
FIG. 3 is the FT-IR chart of SM$_2$O$_3$.

Dielectric materials were prepared in the same manner as in Run No. 13 of Example 1, except for replacing Sm(OH)$_3$ with Sm$_2$O$_3$ (i.e., raw material containing no hydroxyl group) or Sm$_2$O$_3$ having a moisture absorption layer on the surface thereof (i.e., hydroxyl-containing raw material) and carrying out the sintering at the sintering temperature indicated in Table 3 below. The FT-IR chart of the hydroxyl-containing Sm$_2$O$_3$ and that of Sm$_2$O$_3$ are shown in FIGS. 2 and 3, respectively. The dielectric characteristics of the resulting dielectric materials are shown in Table 3, in which the asterisk mark * indicates that the process is out of the scope claimed in the present invention. In Table 3 are also shown the results of Run No. 13 for reference.

TABLE 3

| Run No. | Starting Material for Sm Component | Alkali Metal Oxide Alkali metal | Amount (part) | $Bi_2O_3$ Content (part) | Sintering Temp. (° C.) | Dielectric Characteristics $\epsilon_r$ | $Q_u \times f_0$ (GHz) | $\tau_f$ (ppm/° C.) |
|---|---|---|---|---|---|---|---|---|
| 13 | $Sm(OH)_3$ | Na | 0.5 | 3.0 | 1350 | 93 | 6500 | −20 |
| 25 | OH-containing $Sm_2O_3$ | | | | | 94 | 6200 | −16 |
| 26 | * | | | | | unmeasurable | | |
| 27 | $Sm_2O_3$ (containing no OH) | | | | 1400 | | | |

As can be seen from Table 3, the dielectric materials prepared by using Sm $(OH)_3$ (Run No. 13) or hydroxyl-containing $Sm_2O_3$ (Run No. 25) as a starting material for the Sm component have $Q_u \times f_0$ of 6000 GHz or higher and an improved $\epsilon_r$. To the contrary, sufficient densification could not be achieved in Run Nos. 26 and 27 in which $Sm_2O_3$ containing no hydroxyl group was used so that dielectric characteristics were unmeasurable. In Run No. 27 where the sintering was effected at an elevated temperature, the sinterability was improved slightly but not sufficiently for enabling measurements of dielectric characteristics.

EXAMPLE 3

Investigation on Dispersing Medium in Primary Mixing and Grinding

A dielectric material was obtained in the same manner as in Run No. 26 of Example 2, except for using water as a dispersing medium for primary mixing and grinding in place of ethanol. The dielectric characteristics of the resulting dielectric material are shown in Table 4.

EXAMPLE 4

Investigation on Kind of Rare Earth Element

Dielectric materials were prepared in the same manner as in Run No. 19, except for using $Sm(OH)_3$ as a starting material for $Sm_2O_3$ and also using an oxide of a rare earth element other than Sm in combination as shown in Tables 5 to 8 below. More specifically, part of Sm was displaced with La in Run Nos. 29 to 31, Ce in Run Nos. 32 to 34, Pr in Run Nos. 35 to 37, or Nd in Run Nos. 38 to 40. The dielectric characteristics of the resulting dielectric materials are shown in the same Tables.

TABLE 4

| Run No. | Starting Material for Sm Component | Dispersing Medium | Alkali Metal Oxide Alkali metal | Amount (part) | $Bi_2O_3$ Content (part) | Sintering Temp. (° C.) | Dielectric Characteristics $\epsilon_r$ | $Q_u \times f_0$ (GHz) | $\tau_f$ (ppm/° C.) |
|---|---|---|---|---|---|---|---|---|---|
| 26 | $Sm_2O_3$ | ethanol | Na | 0.5 | 3.0 | 1350 | unmeasurable | | |
| 28 | | water | | | | | 92 | 6400 | −15 |

Table 4 proves that a sufficiently densified dielectric material with excellent dielectric characteristics can be obtained by using water as a dispersing medium in primary mixing and grinding even where the starting material contains no hydroxyl group.

TABLE 5

| | Main Component | | | | Alkali Metal Oxide | | $Bi_2O_3$ | | Dielectric Characteristics | | |
|---|---|---|---|---|---|---|---|---|---|---|---|
| Run No. | BaO x | $Sm_2O_3$ y | $La_2O_3$ | $TiO_2$ z | Alkali metal | Amount (part) | Content (part) | Sintering Temp. ° C. | $\epsilon_r$ | $Q_u \times f_0$ (GHz) | $\tau_f$ (ppm/° C.) |
| 19 | 15.0 | 15.0 | — | 70.0 | Na | 0.5 | 3.5 | 1350 | 87 | 6500 | −18 |
| 29 | | 11.2 | 3.8 | | | | | | 90 | 6300 | −2 |
| 30 | | 7.5 | 7.5 | | | | | | 94 | 6200 | 10 |
| 31 | | 3.8 | 11.2 | | | | | | 100 | 6000 | 27 |

TABLE 6

| | Main Component | | | | Alkali Metal Oxide | | $Bi_2O_3$ | | Dielectric Characteristics | | |
|---|---|---|---|---|---|---|---|---|---|---|---|
| Run No. | BaO x | $Sm_2O_3$ y | $CeO_2$ | $TiO_2$ z | Alkali metal | Amount (part) | Content (part) | Sintering Temp. °C. | $\epsilon_r$ | $Q_u \times f_0$ (GHz) | $\tau_f$ (ppm/°C.) |
| 19 | 15.0 | 15.0 | — | 70.0 | Na | 0.5 | 3.5 | 1350 | 87 | 6500 | −18 |
| 32 | | 14.3 | 0.7 | | | | | | 88 | 6700 | −15 |
| 33 | | 13.5 | 1.5 | | | | | | 89 | 6400 | −10 |
| 34 | | 12.8 | 2.2 | | | | | | 91 | 6200 | −6 |

TABLE 7

| | Main Component | | | | Alkali Metal Oxide | | $Bi_2O_3$ | | Dielectric Characteristics | | |
|---|---|---|---|---|---|---|---|---|---|---|---|
| Run No. | BaO x | $Sm_2O_3$ y | $Pr_6O_{11}$ | $TiO_2$ z | Alkali metal | Amount (part) | Content (part) | Sintering Temp. °C. | $\epsilon_r$ | $Q_u \times f_0$ (GHz) | $\tau_f$ (ppm/°C.) |
| 19 | 15.0 | 15.0 | — | 70.0 | Na | 0.5 | 3.5 | 1350 | 87 | 6500 | −18 |
| 35 | | 14.5 | 0.5 | | | | | | 87 | 6500 | −9 |
| 36 | | 14.1 | 0.9 | | | | | | 88 | 6300 | −8 |
| 37 | | 13.6 | 1.4 | | | | | | 90 | 6200 | −3 |

TABLE 8

| | Main Component | | | | Alkali Metal Oxide | | $Bi_2O_3$ | | Dielectric Characteristics | | |
|---|---|---|---|---|---|---|---|---|---|---|---|
| Run No. | BaO x | $Sm_2O_3$ y | $Nd_2O_3$ | $TiO_2$ z | Alkali metal | Amount (part) | Content (part) | Sintering Temp. °C. | $\epsilon_r$ | $Q_u \times f_0$ (GHz) | $\tau_f$ (ppm/°C.) |
| 19 | 15.0 | 15.0 | — | 70.0 | Na | 0.5 | 3.5 | 1350 | 87 | 6500 | −18 |
| 38 | | 13.5 | 1.5 | | | | | | 88 | 6500 | −4 |
| 38 | | 12.0 | 3.0 | | | | | | 88 | 6400 | 6 |
| 40 | | 10.5 | 4.5 | | | | | | 90 | 6100 | 12 |

As can be seen from the results in Tables 5 to 8, dielectric materials having excellent dielectric characteristics similarly to Run No. 19 can be obtained in every case where part of Sm in $Sm_2O_3$ is displaced with other rare earth elements. Comparisons among Run Nos. 29 to 31, among Run Nos. 32 to 34, among Run Nos. 35 to 37, and among Run Nos. 38 to 40 reveal that the $\tau_f$ shifts towards the positive side as the degree of displacement of Sm with other rare earth elements increases. It is thus understood that $\tau_f$ can be controlled without giving great influences to $\epsilon_r$ and $Q_u \times f_0$ by adjusting the ratio of Sm to other rare earth elements. Further, it is seen that the rare earth element oxide used in combination with Sm does not always need to contain a hydroxyl group in order to achieve sufficient densification only if the starting material for the Sm component contains a hydroxyl group.

While the invention has been described in detail and with reference to specific examples thereof, various changes and modifications can be made therein without departing from the spirit and scope thereof. For example, the dielectric materials can contain additional components other than the main component, the alkali metal oxide and $Bi_2O_3$, such as $MnO_2$ or unavoidable impurities, as long as the dielectric characteristics are not substantially affected.

According to the present invention dielectric materials with excellent dielectric characteristics having a relatively large $\epsilon_r$, a small absolute value of $\tau_f$, and a large $Q_u$, particularly a $Q_u$ of 6000 GHz or more. The dielectric materials with such excellent dielectric characteristics can easily be obtained by the process of the invention comprising starting with a hydroxyl-containing raw material as a raw material for the rare earth element component or introducing a hydroxyl group to the raw material for the rare earth element component.

EXAMPLE 5

A First Example of Dielectric Filter Prepared by Using Dielectric Material of the Invention The dielectric material of the present invention may be used in a dielectric filter described in U.S. Pat. No. 5,537,085, hereby incorporated by reference.

Figure 4:
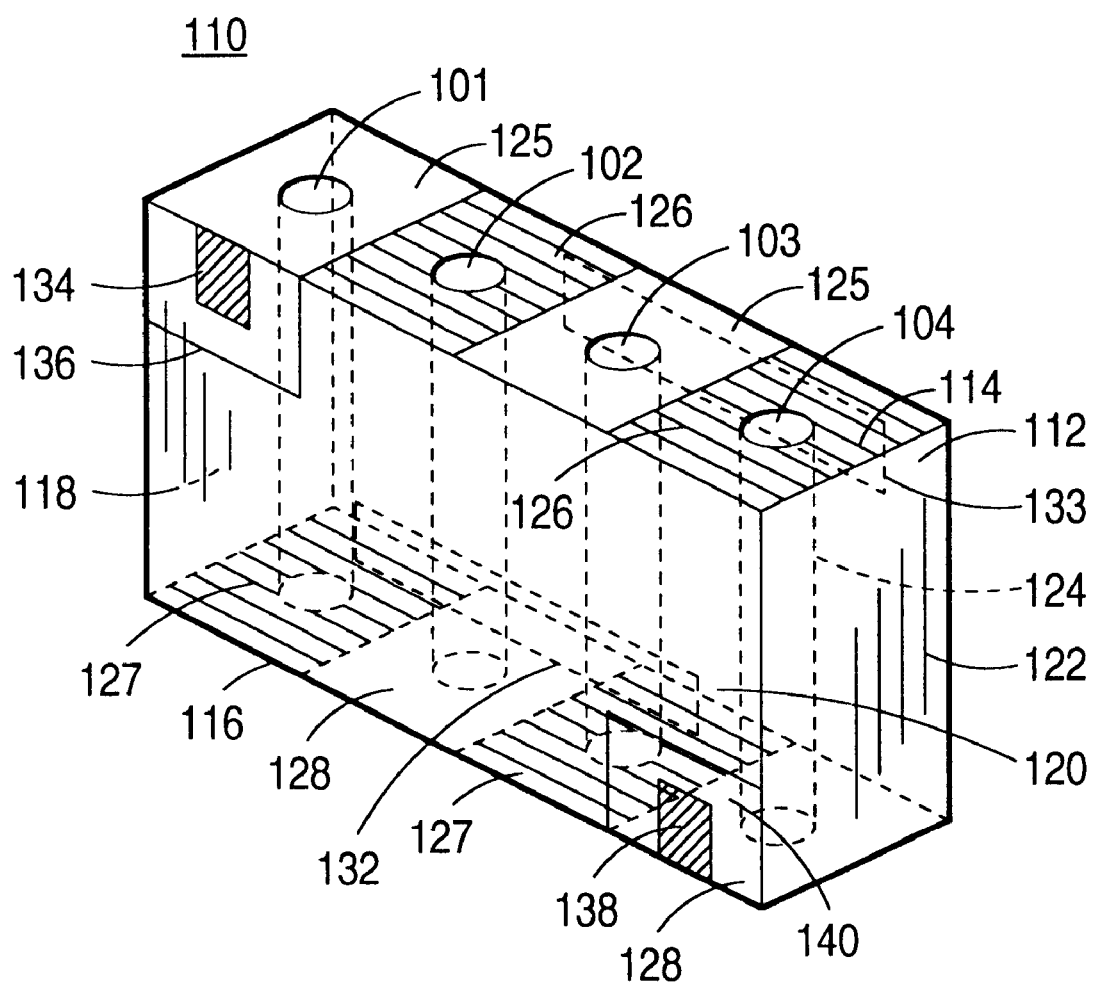
FIG. 4 illustrates a dielectric filter utilizing the dielectric material of the present invention.

FIG. 4 illustrates an example of such a four pole high zero interdigital block filter 110. The filter 110 includes a filter body 112 having a block of the dielectric material of the present invention and having top and bottom surfaces 114 and 116 and side surfaces 118, 120, 122 and 124. The filter body has a plurality of through-holes extending from the top surface to the bottom surface 114 to 116 defining a first resonator 101, a second resonator 102, a third resonator 103, and a fourth resonator 104.

The surfaces 118, 120, 122 and 124 are substantially covered with a conductive material defining a metallized exterior layer, with the exception that the top surface 114 and the bottom surface 116 are selectively metallized in the areas substantially surrounding the resonators defining an interdegital filter design. More specifically, top surface 114 adjacent to a first and a third resonator 101 and 103 are unmetallized 125, and a bottom surface 116 adjacent to a second 102 and a fourth resonator 104 are unmetallized 128. To complete the interdigital design, the bottom surface 116 adjacent to a first and a third resonator 101 and 103 are metallized 127, and the top surface adjacent to the second and a fourth resonator 104 are metallized 126.

Additionally, a portion of one of the side surfaces is substantially uncoated (comprising the dielectric material) in proximity to one of the ends of the block, and extends at least in proximity to between alternate resonators, defining a magnetic transmission line 132 for magnetically coupling the resonators. The ceramic filter 110 also includes first and second input-output means, and preferably in the form of pads 134 and 138 comprising an area of conductive material on at least one of the side surfaces and substantially surrounded by at least one or more uncoated areas 136 and 140 of the dielectric material.

In this embodiment, the input-output pads 134 and 138 are offset on opposite ends of the block. This is necessary because the input-output pads are located near the non-grounded ends of their respective resonators to achieve maximum electrical coupling. In the four-pole resonator design in FIG. 4, the first resonator 101 and the fourth resonator 104 are grounded at opposite ends of the block filter 110, thus requiring the input-output pads to be offset at opposite ends of the block.

The magnetic transmission line 132 may be located on the front surface of the block 120, on the rear surface of the block 124, or both the front and rear surfaces of the block as design parameters dictate. However, in a preferred embodiment, only a single magnetic transmission line 132 is placed on the rear surface 124 opposite to the surface 120 containing the input-output pads 134 and 138.

The magnetic transmission line 132 can be varied to achieve maximum design flexibility. In this embodiment, the magnetic transmission line 132 may extent laterally at least in proximity to the first and third resonators or it may extend laterally in proximity to the second and fourth resonators, shown as item 133 in FIG. 4. The four pole interdigital block filter 110 can lead to a product which is easier to manufacture, and require less processing steps, than conventional four pole ceramic block filters.

EXAMPLE 6

A Second Example of Dielectric Filter Prepared by Using Dielectric Material of the Invention The dielectric material of the present invention may be used in a dielectric filter described in U.S. Pat. No. 5,612,654, hereby incorporated by reference.

Figure 5A:
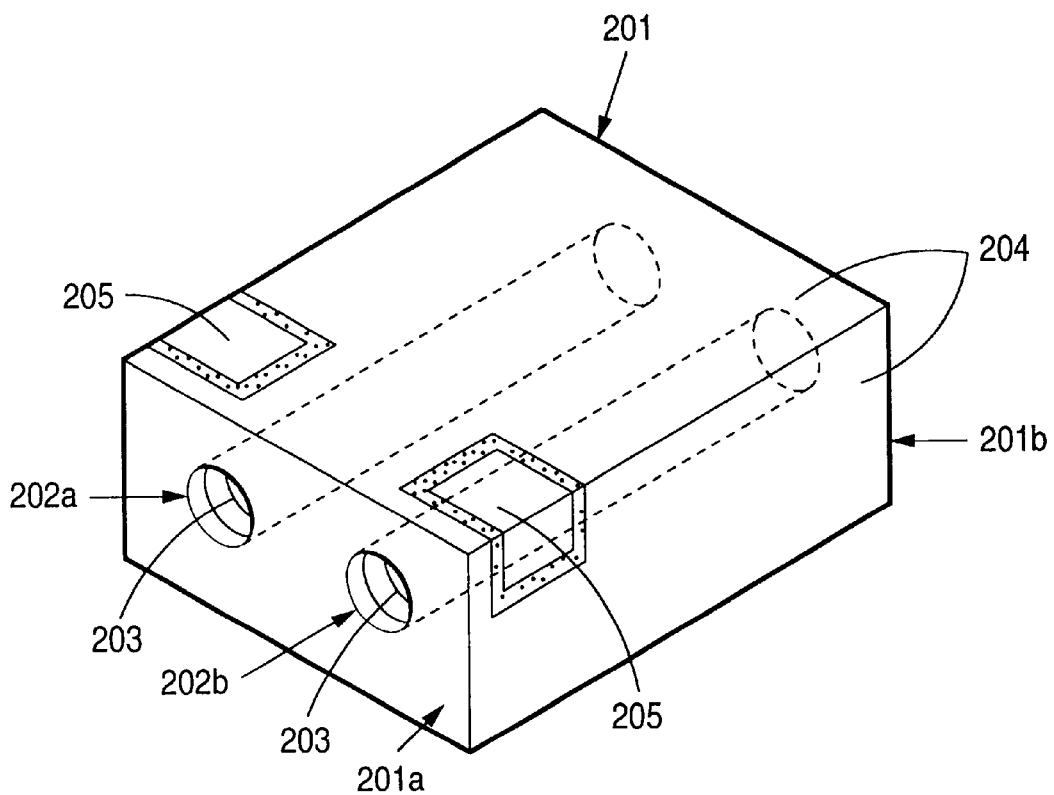
FIG. 5A is a perspective view of a dielectric filter utilizing the dielectric material of the present invention.
Figure 5B:
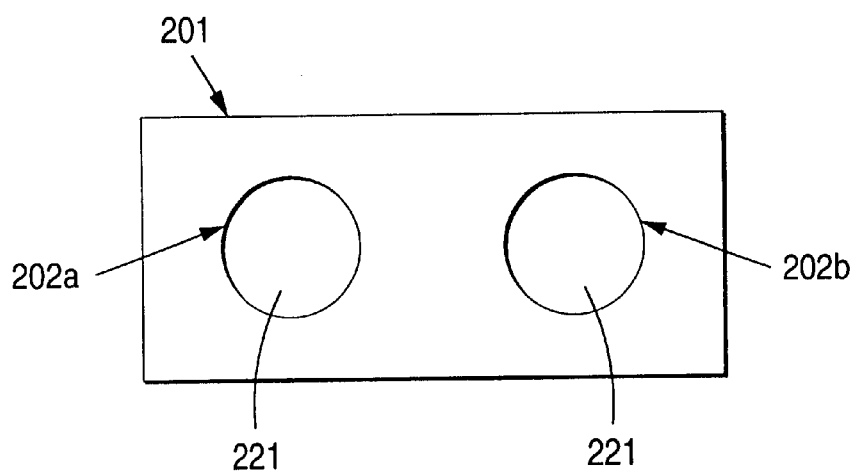
FIG. 5B is a front view of taken from the open end surface of FIG. 5A.

For example, the dielectric filter shown in FIGS. 5A and 5B includes resonator holes 202*a* and 202*b*.

In the structure shown in FIGS. 5A and 5B, the coupling between the two resonators formed at resonator holes 202*a* and 202*b* is inductive coupling, and one attenuation pole is formed in the high frequency range of the pass band. A pair of input/output electrodes 205 are formed at prescribed portions on the outer surface of dielectric block 201. Inner conductors 203 are formed on the inner surfaces of resonator holes 202*a* and 202*b*.

What is claimed is:

1. A dielectric material comprising:

100 parts by weight of a main component having a composition represented by formula: $xBaO-yRE_2O_3-zTiO_2$, said $RE_2O_3$ is represented by the formula $\{(Sm_2O_3)_{1-a-b}(Nd_2O_3)_a(La_2O_3)_b\}$ wherein $a+b<1$ and $(1-a-b) \leq 0.7$, and $x+y+z=100$ mol %;

0.1 to 5 parts by weight of at least one alkali metal oxide; and 0.1 to 5 parts by weight of $Bi_2O_3$.

2. A dielectric material according to claim 1, which has a product of unloaded Q-value and resonance frequency of 6000 GHz or more.

3. A dielectric material according to claim 2, wherein the amount of the $Bi_2O_3$ is from 0.5 to 3.5 parts by weight.

4. A dielectric material according to claim 2, wherein the amount of said at least one alkali metal oxide is 0.1 to 3 parts by weight.

5. A dielectric material according to claim 1, wherein the amount of the $Bi_2O_3$ is 0.1 to 3.5 parts by weight.

6. A dielectric material according to claim 5, wherein the amount of said at least one alkali metal oxide is 0.1 to 3 parts by weight.

7. A dielectric material according to claim 1, wherein the amount of the $Bi_2O_3$ is from 0.5 to 3.5 parts by weight.

8. A dielectric material according to claim 1, wherein the amount of said at least one alkali metal oxide is 0.1 to 3 parts by weight.

9. A dielectric material according to claim 1, wherein $0 < x \leq 27.0$, $0 < y \leq 30.0$, and $55.0 \leq z < 100.0$.

10. A dielectric material according to claim 1, wherein $5.0 \leq x \leq 22.5$, $0 < y \leq 21.0$, and $62.5 \leq z < 95.0$.

11. A process for producing the dielectric material of claim 1, said dielectric material comprising:

100 parts by weight of a main component having a composition represented by formula: $xBaO-yRE_2O_3-zTiO_2$, said $RE_2O_3$ is represented by the formula $\{(SM_2O_3)_{1-a-b}(Nd_2O_3)_a(La_2O_3)_b\}$ wherein $a+b<1$ and $(1-a-b) \leq 0.7$, and $x+y+z=100$ mol %;

0.1 to 5 parts by weight of at least one alkali metal oxide; and 0.1 to 5 parts by weight of $Bi_2O_3$, which comprises using a raw material containing a hydroxyl group as a starting material for said $RE_2O_3$.

12. A process according to claim 11, wherein said raw material is a rare earth element hydroxide represented by $RE(OH)_3$, wherein RE represents a rare earth element.

13. A process for producing a dielectric material according to claim 1, which comprises a step of introducing a hydroxyl group to the surface of the starting material for said $RE_2O_3$.

14. A process according to claim 13, wherein said step of introducing a hydroxyl group is a mixing step using water as a dispersing medium.

15. A dielectric filter comprising the dielectric material of claim 1.

16. A dielectric material according to claim 1, wherein $10.0 \leq y \leq 30.0$.

17. A dielectric material according to claim 1, wherein $10.0 \leq y \leq 21.0$.

* * * * *